(12) United States Patent
Saber et al.

(10) Patent No.: US 11,764,652 B2
(45) Date of Patent: Sep. 19, 2023

(54) POLYPHASED ELECTRICAL MACHINE WITH INTEGRATED POWER ELECTRONICS AND AN INTEGRATED COOLANT CIRCUIT

(71) Applicant: SAFRAN, Paris (FR)

(72) Inventors: Christelle Saber, Moissy-Cramayel (FR); Cyrille Gautier, Moissy-Cramayel (FR); Marwan Ali, Moissy-Cramayel (FR)

(73) Assignee: SAFRAN, Paris (FR)

(*) Notice: Subject to any disclaimer, the term of this patent is extended or adjusted under 35 U.S.C. 154(b) by 494 days.

(21) Appl. No.: 17/262,248

(22) PCT Filed: Jul. 25, 2019

(86) PCT No.: PCT/FR2019/051843
§ 371 (c)(1),
(2) Date: Jan. 22, 2021

(87) PCT Pub. No.: WO2020/025884
PCT Pub. Date: Feb. 6, 2020

(65) Prior Publication Data
US 2021/0351670 A1  Nov. 11, 2021

(30) Foreign Application Priority Data

Jul. 31, 2018  (FR) ..................... 1857144

(51) Int. Cl.
*H02K 9/16* (2006.01)
*H02K 5/20* (2006.01)
(Continued)

(52) U.S. Cl.
CPC ............ *H02K 11/33* (2016.01); *H02K 5/203* (2021.01); *H02K 7/003* (2013.01)

(58) Field of Classification Search
CPC .. H02K 5/00; H02K 5/08; H02K 5/16; H02K 5/18; H02K 5/20; H02K 5/203;
(Continued)

(56) References Cited

U.S. PATENT DOCUMENTS

2007/0013241 A1* 1/2007 Schiferl ............... H02K 15/024
310/58
2012/0098391 A1* 4/2012 Yamasaki ............. H02K 11/33
310/68 D
(Continued)

FOREIGN PATENT DOCUMENTS

| EP | 3148303 A1 | 3/2017 |
|---|---|---|
| WO | WO 2013/114043 A2 | 8/2013 |
| WO | WO 2014/044428 A1 | 3/2014 |

OTHER PUBLICATIONS

Search Report dated Apr. 11, 2019, in FR Application No. 1857144 (2 pages).
(Continued)

*Primary Examiner* — Tran N Nguyen
(74) *Attorney, Agent, or Firm* — Bookoff McAndrews, PLLC

(57) ABSTRACT

Polyphase electrical machine with n phases, n≥3, including a casing defining a longitudinal axis, a stator and a rotor including a mechanical drive shaft, the electrical machine being equipped with a power electronics and a coolant circuit and the power electronics is formed of n power electronic modules evenly distributed over an inner circumference of a longitudinal extension of the casing whose outer circumference is covered with a single annular DC bus decoupling capacitor electrically connected to the n power electronic modules, the coolant circuit including a plurality of U-shaped tubes with a tubular outgoing part extending over an entire length of the casing and including the longitudinal casing extension and a shorter tubular return part,
(Continued)

extending over a casing length excluding the longitudinal casing extension.

10 Claims, 3 Drawing Sheets

(51) Int. Cl.
  *H02K 11/33* (2016.01)
  *H02K 7/00* (2006.01)
(58) Field of Classification Search
  CPC .......... H02K 5/22; H02K 5/225; H02K 11/00; H02K 11/33; H02K 3/00; H02K 3/49; H02K 7/00; H02K 7/003; H01G 4/00; H01G 4/22; H01G 4/224; H01G 4/28; H01G 4/40; H01G 2/00; H01G 2/10; H01G 2/106
  See application file for complete search history.

(56) References Cited

U.S. PATENT DOCUMENTS

| | | | |
|---|---|---|---|
| 2015/0001972 A1* | 1/2015 | Miyama | H02K 9/00 310/52 |
| 2016/0276895 A1 | 9/2016 | Aizawa et al. | |
| 2017/0077779 A1* | 3/2017 | Hanioka | H02K 9/227 |
| 2020/0014285 A1* | 1/2020 | Chang | H02K 5/207 |

OTHER PUBLICATIONS

English translation of International Search Report issued in International Application No. PCT/FR2019/051843 dated Nov. 27, 2019 (2 pages).

\* cited by examiner

POLYPHASED ELECTRICAL MACHINE WITH INTEGRATED POWER ELECTRONICS AND AN INTEGRATED COOLANT CIRCUIT

CROSS-REFERENCE TO RELATED APPLICATION(S)

This application is the U.S. national phase entry under 35 U.S.C. § 371 of International Application No. PCT/FR2019/051843, filed on Jul. 25, 2019, which claims priority to French Patent Application No. 1857144, filed on Jul. 31, 2018.

BACKGROUND OF THE INVENTION

The invention concerns the field of electrification/hybridization of the propulsion mainly of airplanes and other rotorcrafts, but also the non-propulsion applications such as the onboard network generation and it relates more particularly to a new architecture for integrating the power electronics as close as possible to a polyphase electrical machine for air or land vehicles.

The electrification of aircrafts, and more particularly that of their propulsion, leads to the increase of the levels of on-board electrical powers (shift from hundreds of kW to MW) which directly impact the entire conversion chain dedicated to the electrical power generation. This concerns both electromechanical converters (electrical machines) and electrical converters (power electronics). Thus, a current major concern consists in increasing the volumetric power density in order to improve the compactness of the entire system {electrical machine+power electronics+associated command} while aiming for improved performances (increasing the energy efficiency, ensuring the mechanical strength, managing the thermal aspects, availability, reliability, etc.).

Solutions known under the name of "Integrated Modular Motor Drive" or "Smart Motor" propose to integrate the power electronics as close as possible to the electrical machine either internally to the casing of the machine or externally, on the surface or at the end of this casing.

However, these solutions still suffer from numerous drawbacks. The radial surface integration external to the casing where the power electronics is not distributed has the defect of low compactness, losses in the non-distributed semiconductor devices and poor compatibility with modular power electronics. The axial surface integration external to the casing requires a space available at one of the two ends of the casing which is not always present in the aeronautical applications. The integration internal to the casing compatible with modular power electronics presents however thermal constraints related to temperature strength and integration constraints related to the volume of the capacitors of the DC bus.

OBJECT AND SUMMARY OF THE INVENTION

The present invention therefore proposes new integrated variable-speed drive architecture for a polyphase electrical machine qualified as hybrid, that is to say whose power electronics is both internal and external to the casing, overcoming the drawbacks above.

This aim is achieved with a polyphase electrical machine with n phases including a casing defining a longitudinal axis, a stator and a rotor including a mechanical drive shaft, the electrical machine being equipped with a power electronics and a coolant circuit, said power electronics being formed of n power electronic modules evenly distributed over an inner circumference of a longitudinal extension of said casing whose outer circumference is covered with a single annular DC bus decoupling capacitor electrically connected to said n power electronic modules, machine characterized in that said coolant circuit includes a plurality of U-shaped tubes with a tubular outgoing part extending over an entire length of the casing and including said longitudinal casing extension and a shorter tubular return part length, extending over a casing length excluding said longitudinal casing extension.

The use of a single annular decoupling capacitor and of the modular disposition of the power electronics in an extension of the casing significantly increases the volumetric power density while solving the problem posed by the large volume of this type of components.

Advantageously, a coolant is introduced at a first end of said U-shaped tubes through a radial inlet orifice disposed at a free end of said longitudinal casing extension and extracted at a second end of said U-shaped tubes, through a radial outlet orifice.

With such an arrangement ensuring a cooling of the power electronics before that of the electrical machine, the heat extraction is significantly improved as is the temperature strength of the machine.

Preferably, said radial inlet orifices open radially into an annular fluid distribution groove supplying said plurality of U-shaped tubes with coolant.

Advantageously, said U-shaped tubes of said coolant circuit are disposed in a higher number at said power electronic modules.

Preferably, said tubular return part is disposed outside said tubular outgoing part and opens substantially at one end of the stator into an annular fluid distribution groove from which said radial outlet orifice emerges for the discharge of the coolant previously introduced into said tubular outgoing part through a radial inlet orifice opening radially into an annular fluid distribution groove. In this configuration, the electrical machine further includes an outer jacket surrounding the electrical machine at said tubular return part.

According to a particular embodiment, the electrical machine may further include n filter blocks disposed alternately with said power electronic modules on said inner circumference of said longitudinal extension.

Preferably, the electrical machine further includes a cover at each of its two ends, a first cover, closest to said power electronic modules, being configured to receive on an inner face a control unit of said power electronic modules and a second cover being pierced in its center to allow the passage of said mechanical drive shaft.

Advantageously, said single annular decoupling capacitor is a HT PTFE type film capacitor having two electrical inlets and n identical electrical outlets disposed opposite said n power electronic modules.

Preferably, said polyphase electrical machine includes n power electronic modules each including two switching elements and if necessary n filter blocks each including a filter inductor.

BRIEF DESCRIPTION OF THE DRAWINGS

The invention will be better understood upon reading the description given below by way of indication but without limitation with reference to the following figures in which.

DETAILED DESCRIPTION OF EMBODIMENTS OF THE INVENTION

Figure 5:
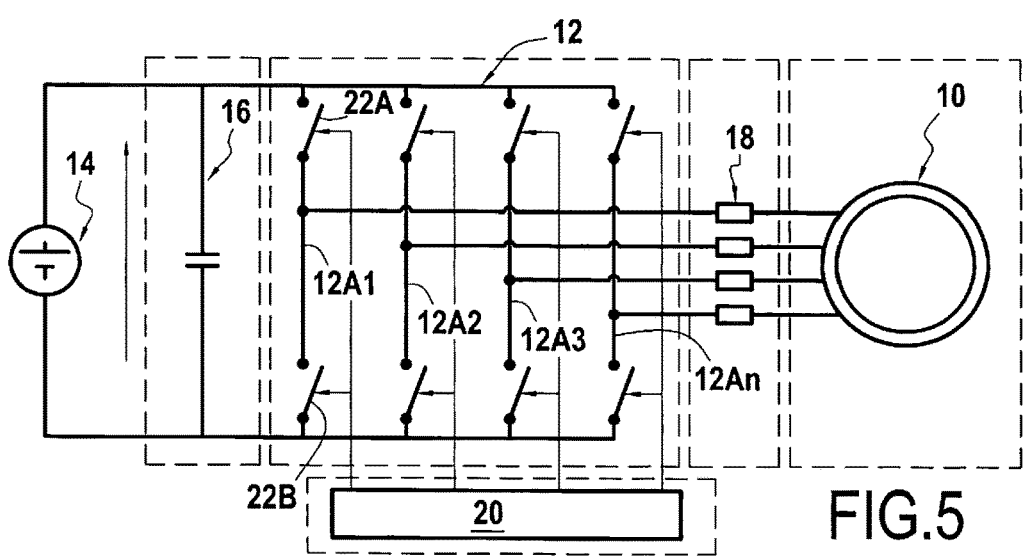
FIG. 5 is an electrical diagram illustrating a polyphase electrical machine and its associated power electronics.

FIG. 5 is a block diagram of the command of a polyphase electrical machine 10 by an inverter 12, for example at two levels, supplied from a direct power source 14. For the simplicity of the drawing, the example given by way of illustration and without limitation shows a 4-arm inverter which supplies a 4-phase machine. However, it should be understood by "polyphase machine" an electrical machine having a number of phases in the stator greater than or equal to 3. As known, a decoupling capacitor 16 disposed between the power source and the inlet of the inverter allows smoothing any variation in the voltage of the power source (in particular when it includes a rectifier) and filter inductors 18 disposed between the outlet of the inverter and the electrical machine allow limiting in the electrical machine the electromagnetic interferences resulting from the switching of the inverter. It will however be noted that these filter inductors can be omitted when electromagnetic compatibility is not a desired characteristic and the length of the power cables linking the inverter to the stator of the electrical machine is relatively short.

In a classical two-level bridge architecture, the inverter 12 includes as many power arms 12A1, 12A2, . . . , 12An as there are phases 1, 2, . . . , n of the electrical machine and each power arm includes two switching elements (e.g. 22A, 22B). The midpoint of a pair of switching elements of the same power arm is linked to a phase winding of the stator of the electrical machine. The switching elements (thyristor, IGBT, MOSFET or the like) are piloted in a known manner by a control unit 20 implementing sinusoidal or vector pulse-width modulation (PWM) methods, or the like.

Figure 1:
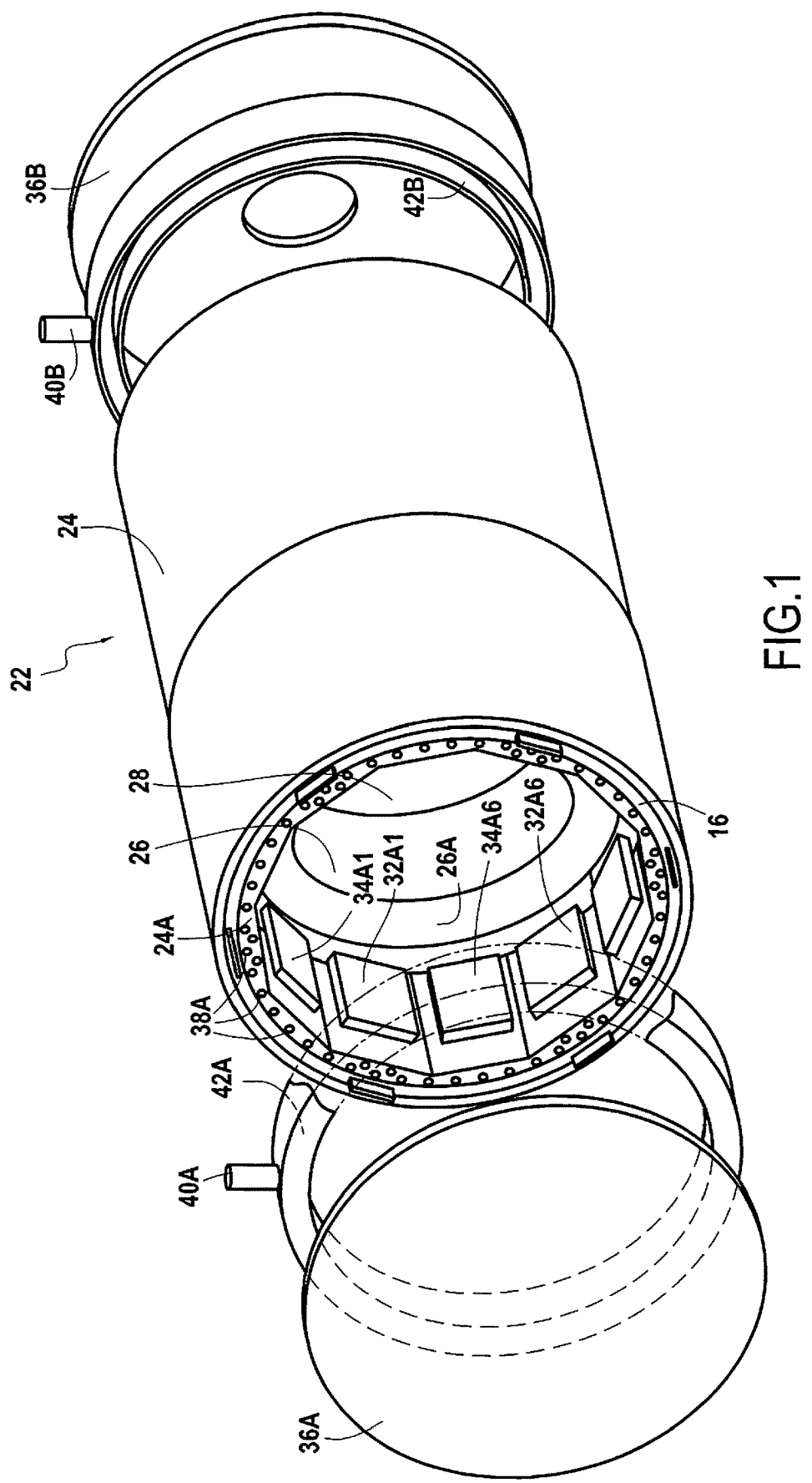
FIG. 1 is a perspective view of a first exemplary embodiment of a polyphase electrical machine with integrated power electronics according to the invention.
Figure 2:
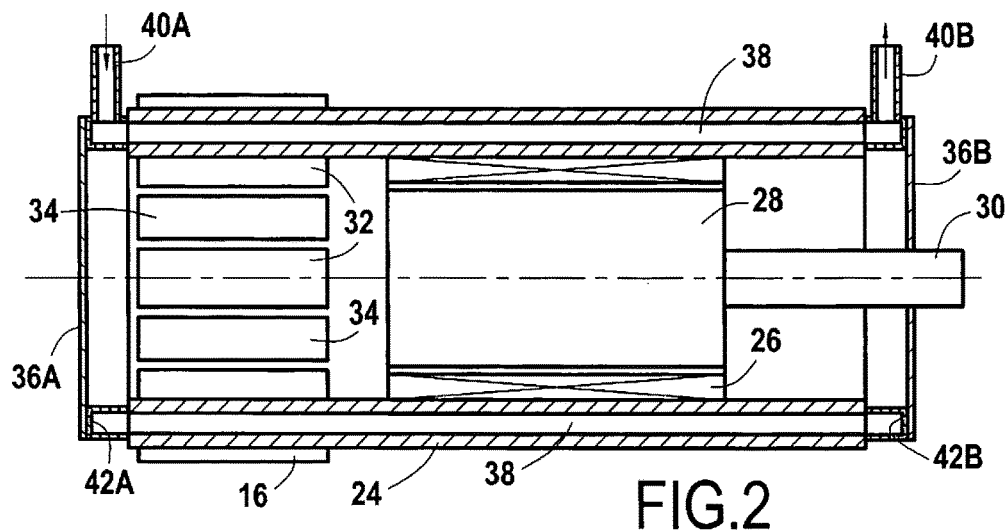
FIG. 2 is a longitudinal section of the polyphase electrical machine of FIG. 1.

FIGS. 1 and 2 show, in external view and in longitudinal section, a first example of an essentially cylindrical structure of such a polyphase electrical machine 22 including a tubular casing 24, an annular stator 26 and a cylindrical rotor 28. The casing 24 surrounds the stator 26 which itself surrounds the rotor 28 crossed by a mechanical drive shaft 30 defining a longitudinal axis of rotation of the electrical machine.

According to the invention, the casing 24 has a longitudinal extension 24A at one end 26A of the two ends of the stator 26 to also surround the different components allowing the command of the electrical machine, namely the power electronic modules 32 integrating the switching elements and the filter blocks 34 integrating the filter inductors. Modules and blocks are disposed alternately on the inner circumference of the casing 24 at this extension 24A. In the example illustrated, of course given by way of illustration and without limitation, the polyphase electrical machine is a six-phase machine and therefore includes six power electronic modules 32A1-32A6 each including two switching elements 22A, 22B and if necessary six filter blocks 34A1-34A6 each including a filter inductor 18.

The integration of these different electronic components in the extension of the casing allows a minimization of the lengths of the electrical cables linking the inverter to the electrical machine, which allows limiting the corona effect and the aging of the bearings as insulators of the electrical machine (improved service life).

In addition, by using such modular polyphase solutions, the on-board electrical power is easily increased (increase in the volumetric densities). This modularity also allows increasing the fault tolerance and the availability of the electrical machine.

The DC bus decoupling capacitor 16 is made in an annular form and disposed on the outer circumference of the casing 24 at the extension 24A over a width therefore substantially corresponding to those of the aforementioned modules and blocks disposed alternately on its inner circumference and to which it is electrically connected. It has two electrical inlets, advantageously placed on the side of the groove 42B, and n identical electrical outlets, advantageously placed on the side of the groove 42A, and disposed opposite the electrical inlets of the n power modules, so as to minimize these inlet/outlet distances and thus reduce the parasitic inductances of the switching elements (or cells) to avoid overvoltages and improve the electromagnetic compatibility of the system. The use of such an annular capacitor with large inner diameter by ensuring a homogeneous surface distribution around the casing allows a reduction of weight and volume and limits the use of heat sinks because its disposition also allows it to take advantage of the cooling from which the electronic components benefit, as will be described later. An annular capacitor suitable for the present invention is for example a HT PTFE (High Temperature PolyTetraFluoroEthylene) film capacitor.

The polyphase electrical machine 22 is closed at each of its two ends by a flange or cover 36A, 36B, the first cover 36A, closest to the power electronic modules, being intended to receive on its face internal to the polyphase electrical machine the control unit 20 (not represented) of these modules. The second cover 36B is pierced in its center for the passage of the mechanical drive shaft 30.

According to the invention, the casing 24 further includes a coolant circuit formed of a plurality of rectilinear longitudinal tubes 38 evenly distributed around the casing and passing right therethrough, and ensuring the cooling both of the polyphase electrical machine and of its power and control electronics. More specifically, to promote the extraction of heat from the switching elements, the entry of a coolant (advantageously water or oil) is effected through a radial inlet orifice 40A opening into an annular fluid distribution groove 42A disposed at the first cover 36A at the free end of the casing extension, and its exit through a radial outlet orifice 40B opening into an annular fluid distribution groove 42B disposed at the second cover 36B. Thus, the power electronic modules 32 integrating the switching elements, the filter blocks 34 integrating the filter inductors and the decoupling capacitor 16 will be in contact with the coolant first, the electrical machine itself being in contact with this coolant only afterwards. It will however be noted that, as illustrated, the number of longitudinal rectilinear tubes of the coolant may be higher at the power modules (five in this case) than at the filter inductors (only three).

Figure 4:
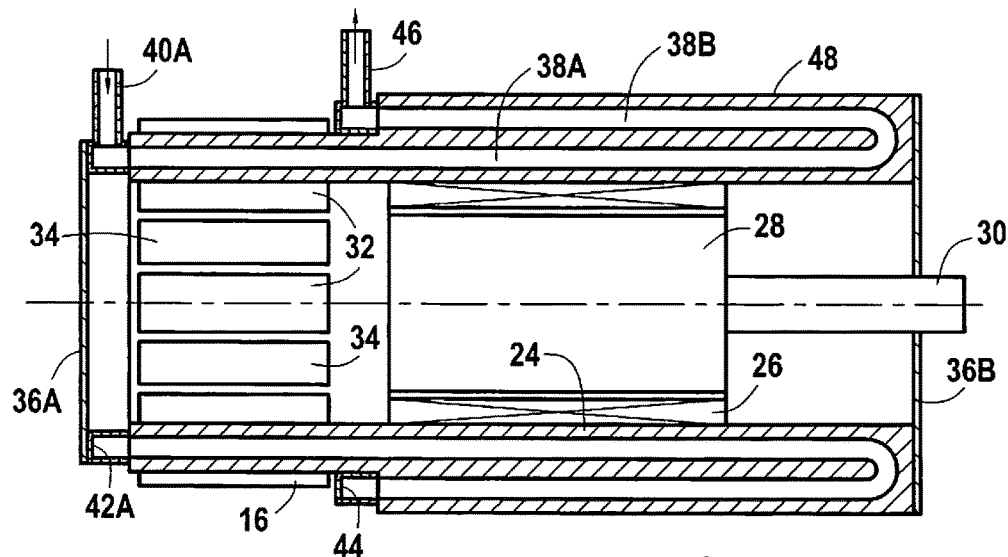
FIG. 4 is a longitudinal section of the polyphase electrical machine of FIG. 3.
Figure 3:
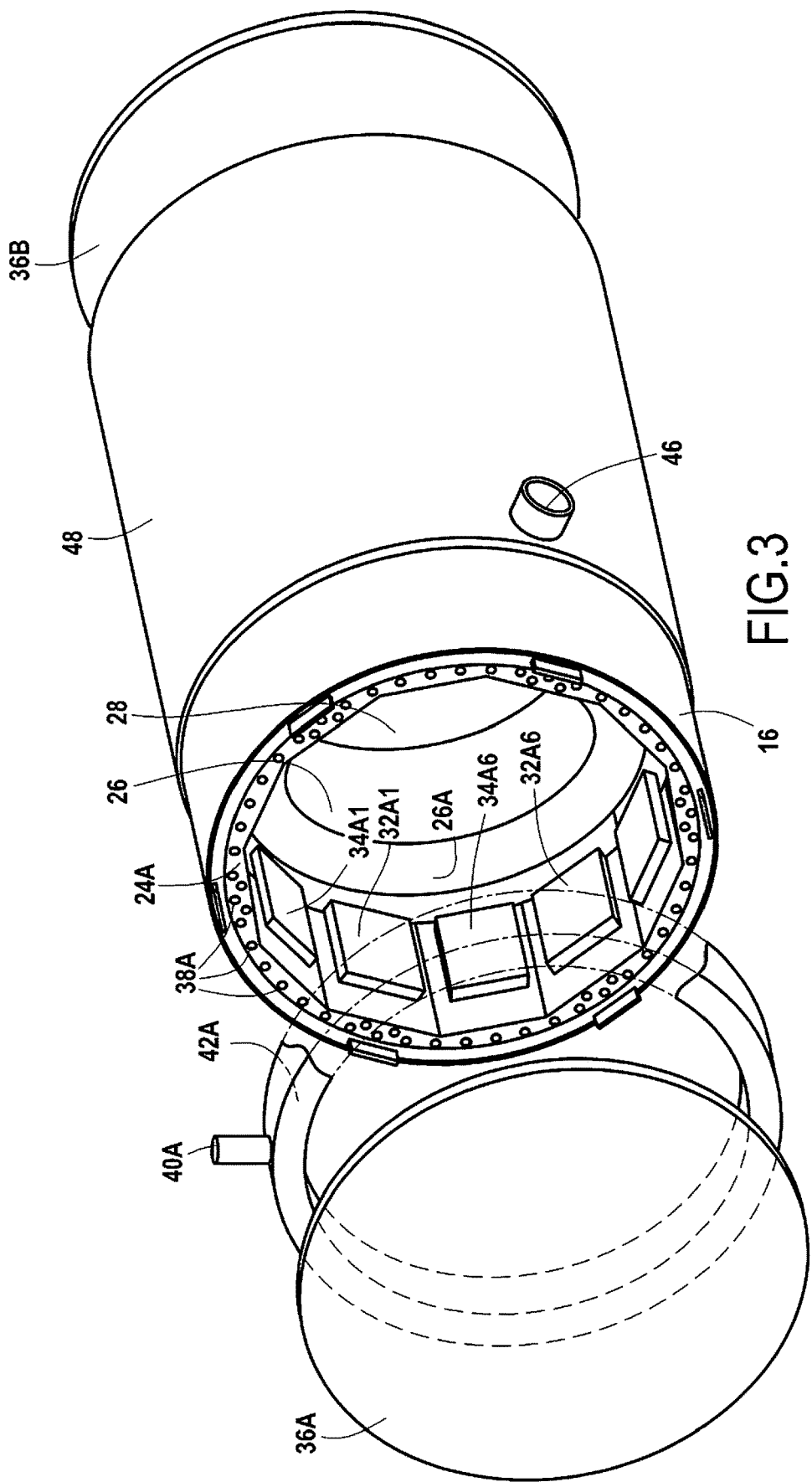
FIG. 3 is a perspective view of a second exemplary embodiment of a polyphase electrical machine with integrated power electronics according to the invention.

A second structural example of a polyphase electrical machine with six phases according to the invention is illustrated in FIGS. 3 and 4. There is, as in the previous example, the casing 24 surrounding the stator 26 which itself surrounds the rotor 28 crossed by the mechanical drive shaft 30. The casing is here also extended at one end by a longitudinal extension 24A intended to receive, on the one hand externally, the annular DC bus decoupling capacitor 16 also having two electrical inlets and n identical electrical outlets disposed opposite the n power modules, and on the other hand internally and alternately, the power electronic modules 32A1-32A6 integrating the switching elements 22A, 22B and the filter blocks 34A1-34A6 integrating the filter inductors.

This second embodiment is distinguished from the first one by its coolant circuit which is no longer made up of only simple rectilinear tubes passing through the casing longitudinally from side to side but of a plurality of U-shaped tubes with a tubular outgoing part extending, like the longitudinal rectilinear tubes 38, over the entire length of the casing (therefore including the casing extension) 38A and a shorter tubular return part 38B since extending over the sole length of the electrical machine (stator, rotor and drive shaft) and therefore excluding the casing extension 24A. It will be noted that this embodiment of the coolant circuit, like the previous one, cannot be considered as limiting and that only a distribution of the coolant circuit, for example as a serpentine around the stator, could also be considered.

The tubular outgoing part extends as previously from the radial inlet orifice 40A opening into the annular fluid distribution groove 42A disposed at the first cover 36A but unlike the previous embodiment, it no longer opens at the second cover 36B but turns over at this end to form the tubular return part, disposed outside the first one, which opens substantially at the end 26A of the stator in an annular fluid distribution groove 44 from which a radial outlet orifice 46 emerges for the discharge of the coolant.

This second configuration of the coolant has the advantage of reducing the temperature gradient between the inlet and the outlet of the electrical machine while maintaining the primary contact with the electronic components and the decoupling capacitor. However, it involves capping off the casing by an outer jacket 48 surrounding the electrical machine at the tubular return part of the coolant circuit.

The invention more particularly finds application in the modular electrical machines integrated in the aeronautical field such as:
  the converters for propulsion applications of the VTOL (Vertical Take Off & Landing) type where each propeller is associated with a converter or of the ePPH (Electrical Power Pack Helicopter) type where hybridization of the turbines is provided to ensure rapid restarting, and
  the converters for non-propulsion applications allowing fixed-frequency electrical generation or electrification of ancillary functions of a turboprop or turbojet.

The invention claimed is:

1. A Polyphase electrical machine with n phases, n≥3, including a casing defining a longitudinal axis, a stator and a rotor including a mechanical drive shaft, the electrical machine being equipped with a power electronics and a coolant circuit, said power electronics being formed of n power electronic modules evenly distributed over an inner circumference of a longitudinal extension of said casing whose outer circumference is covered with a single annular DC bus decoupling capacitor electrically connected to said n power electronic modules, wherein said coolant circuit includes a plurality of U-shaped tubes with a tubular outgoing part extending over an entire length of the casing and including said longitudinal casing extension and a shorter tubular return part, extending over a casing length excluding said longitudinal casing extension.

2. The polyphase electrical machine according to claim 1, wherein a coolant is introduced at a first end of said U-shaped tubes through a radial inlet orifice disposed at a free end of said longitudinal casing extension and extracted at a second end of said U-shaped tubes, through a radial outlet orifice.

3. The polyphase electrical machine according to claim 2, wherein said radial inlet orifice opens radially into an annular fluid distribution groove supplying said plurality of U-shaped tubes with coolant.

4. The polyphase electrical machine according to claim 2, wherein said U-shaped tubes of said coolant circuit are disposed in a higher number at said power electronic modules than that at a predetermined portion of the electric machine.

5. The polyphase electrical machine according to claim 2, wherein said tubular return part is disposed outside said tubular outgoing part and opens substantially at one end of the stator into an annular fluid distribution groove from which said radial outlet orifice emerges for the discharge of the coolant previously introduced into said tubular outgoing part through said radial inlet orifice opening radially into an annular fluid distribution groove.

6. The polyphase electrical machine according to claim 5, further including an outer jacket surrounding the polyphase electrical machine at said tubular return part.

7. The polyphase electrical machine according to claim 1, further including n filter blocks disposed alternately with said n power electronic modules on said inner circumference of said longitudinal extension.

8. The polyphase electrical machine according to claim 1, wherein further includes a cover at each of two ends of the polyphase electrical machine, a first cover, closest to said power electronic modules, being configured to receive on an inner face a control unit of said power electronic modules and a second cover being pierced in a center thereof to allow a passage of said mechanical drive shaft.

9. The polyphase electrical machine according to claim 1, wherein said single annular decoupling capacitor is a HT PTFE (High Temperature PolyTetraFluroEthylene) type film capacitor having two electrical inlets and n identical electrical outlets disposed opposite said n power electronic modules.

10. The polyphase electrical machine according to claim 1, wherein each of said n power electronic modules including two switching elements and, when predetermined a necessary, n filter blocks provided, wherein each of said n filter blocks including a filter inductor.

* * * * *